United States Patent [19]

Larrea et al.

[11] Patent Number: 5,343,663
[45] Date of Patent: Sep. 6, 1994

[54] QUILTING PIN AND METHOD FOR ITS USE

[76] Inventors: Fernando L. Larrea, 3700 Rue Foret, Flint, Mich. 48532; Frank W. Vaydik, 97320 Shattuck Rd., Saginaw, Mich. 48603

[21] Appl. No.: 879,569

[22] Filed: May 7, 1992

[51] Int. Cl.⁵ .............................. E04B 2/00
[52] U.S. Cl. ..................... 52/506.02; 52/506.05; 52/248; 52/404.1; 52/404.2; 52/745.06; 52/745.07; 52/745.21; 411/923
[58] Field of Search ............ 52/741.1, 741.3, 509, 52/512, 404, 248, 249, 506, 745.06, 745.07, 745.08, 745.21, 404, 506.02, 248, 404.1, 404.2; 411/480, 482, 923

[56] References Cited

U.S. PATENT DOCUMENTS

| | | | |
|---|---|---|---|
| 895,846 | 8/1908 | Diers | 411/923 |
| 1,867,354 | 7/1932 | Dickson | 411/377 |
| 2,427,392 | 9/1947 | Eckel | 411/923 |
| 3,230,817 | 1/1966 | Thomas | 411/923 |
| 4,174,596 | 11/1979 | Deibele | 52/404 |
| 4,943,197 | 7/1990 | Baritz | 411/480 |

*Primary Examiner*—Carl D. Friedman
*Assistant Examiner*—Christopher Todd Kent
*Attorney, Agent, or Firm*—Robert L. McKellar

[57] ABSTRACT

This invention deals with novel quilting pins that find use as fasteners for stabilizing insulation inside jacketing to form insulating covers that are installed around hot surfaces. Also disclosed is a method of using the pins to manufacture such insulating covers.

3 Claims, 1 Drawing Sheet

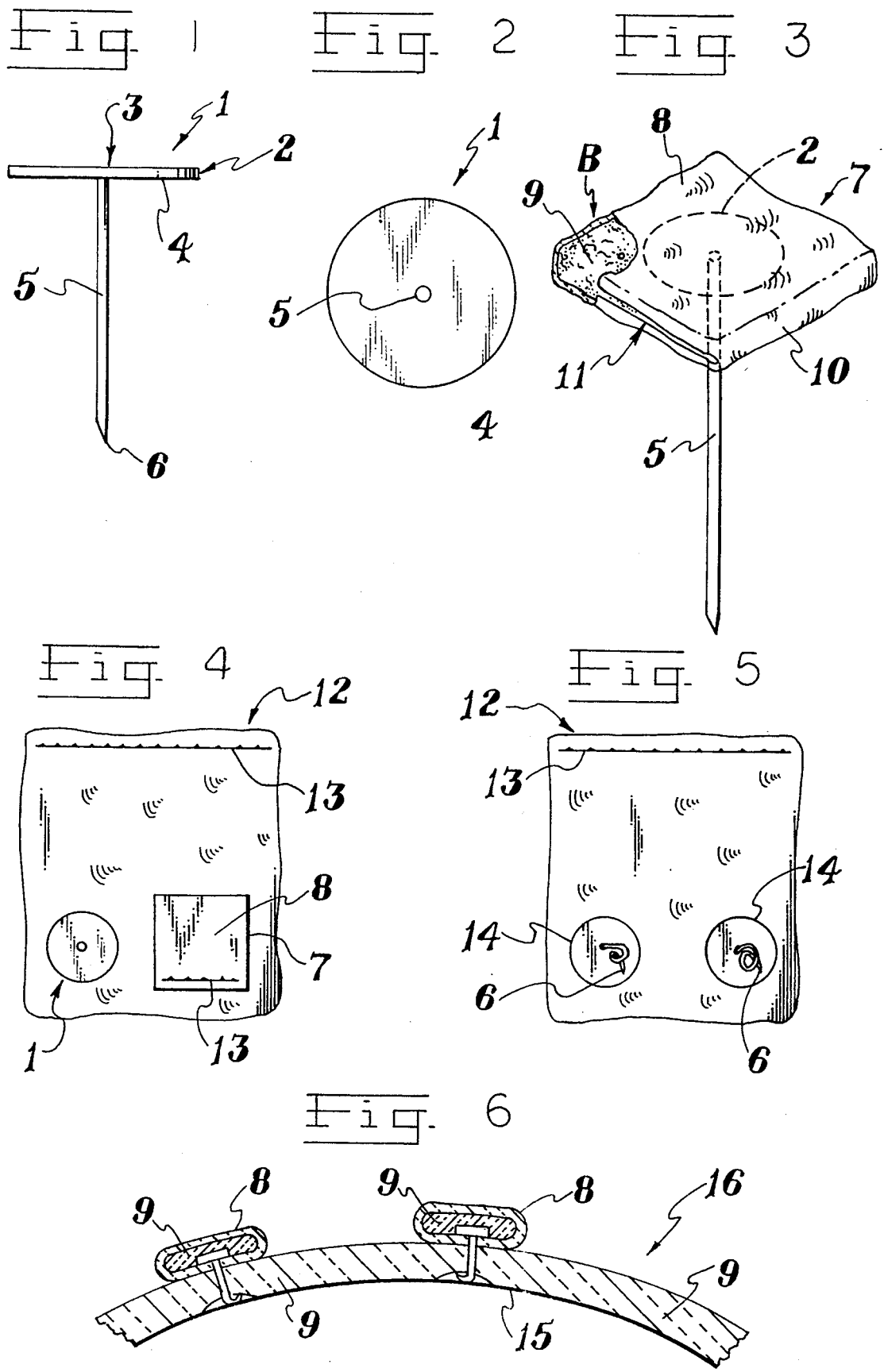

QUILTING PIN AND METHOD FOR ITS USE

This invention deals with novel quilting pins that find use as fasteners for stabilizing insulating material and jacketing material that are combined to form insulation coverings that are installed around hot surfaces.

More specifically, this invention deals with certain specific quilting pins that provide a fastening means for stabilizing insulating material and jacketing material. Such fasteners do not have sharp edges that could cut or snag human skin or clothing. They provide a safe working temperature to the outside surface of the insulation covering when it is in use against a hot surface.

FIELD OF THE INVENTION

The fastners of the instant invention are new and novel. Typically, many hot surfaces and substrates are insulated to prevent the transfer of heat from them to the immediate surroundings and to protect the accidental touching of such surfaces by humans.

To install the insulation cover, the standard procedure is to cut and sew the jacketing to form a cover; stuff the cover with insulation; sew the cover shut; skewer conventional quilting pins through the jacket and the insulation at spaced intervals to hold the insulation in place relative to the jacketing. Wrap the insulation cover around the device to be insulated and secure it in place on the heated substrate using straps or bands.

In this use, the metal pins acquire the temperature of the surface that is being insulated and since these temperatures often run upwards of 500° F. to 1000° F., the insulation cover is handled only with difficulty when the cover is removed or re-installed.

Thus, a need has been shown for a device which will elimate the problems disscussed above, while remaining economical to the user.

There does not seem to be such a device shown in the prior art and no such disclosure is known by the inventor herein.

BRIEF DESCRIPTION OF THE DRAWINGS

FIG. 1 is a side view of a pin.

FIG. 2 is a bottom view of the pin of FIG. 1.

FIG. 3 is an isometric view of a fastener of this invention.

FIG. 4 is a front view of a piece of an insulating cover used in the industry, showing a pin as used in the prior art, and a fastener as used in the instant invention.

FIG. 5 is a back view of the piece of the insulating cover of FIG. 4.

FIG. 6 is a side view in section of insulation covered with a jacketing material used in the industry, fastened with fasteners of this invention.

THE INVENTION

The instant invention deals with new and novel fasteners which are useful for fastening or stabilizing insulation to jacketing material to form a cover to be used around hot surfaces. The pins can be used without acquiring the heat that can be transferred by such hot surfaces while the covering is in use.

The instant invention also deals with a method of insulating hot surfaces to prevent the transmission of heat therefrom using the fasteners of the instant invention to stabilize the insulation in combination with the jacketing material while the insulation cover is being prepared and when the cover is installed or removed.

Thus, the instant invention deals with a fastener. The fastener comprises a penetration device having a metal head and an elongated malleable metal shank wherein the head is essentially flat and has a top surface and a bottom surface.

The elongated metal shank is firmly attached to the bottom surface of the metal head, and near the center such that it forms a spike with a flat top. The elongated metal shank has a piercing end at the end distal to its attachment to the head and the metal head is essentially enveloped by an insulating material covered by a jacketing material.

This invention also deals with a method of insulating a heated substrate, the method comprises providing the heated substrate with an insulating material in a jacketing material, such insulating and jacketing material being held stable relative to each other by the fasteners of this invention. The last step of the method is securing each of the fasteners with a base.

DETAILED DESCRIPTION OF THE DRAWINGS

With reference to FIG. 1, there is shown a pin 1 useful in the device of this invention. There is shown a head 2 which is essentially flat and disk shape. However the particular shape of the head 2 does not seem to be critical and it can be slightly rounded in a convex manner, or square, or triangular in configuration without detracting from the critical aspects of this invention. The head 2 has a top surface 3 and a bottom surface 4. With reference to FIGS. 1 and 2, there is shown essentially centered in the bottom surface 4, an elongated shaft 5. The elongated shaft 5 is firmly fastened to the head 2 such that the two in combination form a flat-headed stick pin or spike.

The elongated shaft 5 is nominally manufactured at various lengths and diameters and the best combination for this invention is a pin 1 which has a length of from 2 inches to about 5 inches. The diameter of the pin 2 should be on the order of about 10 to about 16 gage wire diameter.

The head 2 and the elongated shaft 5 should both be manufactured from materials that can withstand the prolonged heat that will be encountered during their use. Thus, the pins 1 can be manufactured from metals, said metals being light weight, such as stainless steel or aluminum.

The elongated shaft 5, for purposes of this invention, should be manufactured out of a malleable metal so that the pin can participate in the securing function of the pin 1, which will be explained infra.

The end of the elongated shaft 5 that is most distal from the head 2 of the pin 1, has a piercing point 6 such that it can be insertable into and through any insulation material and jacketing material that is being used in the inventive method herein.

The pin 1, without the insulation and jacketing just described is not independently claimed in this invention as it is a conventional pin used in this industry and forms part of the prior art.

With regard to FIG. 3, there is shown in an isometric view, a fastener 7 of this invention. There is shown the elongated shaft 5 and the head 2 in phantom. Enveloping the entire head 2, and a small portion of the pin 1, is a jacket or covering 8. This covering or jacketing is designed to be used with very hot surfaces and comprises such materials as silicone impregnated fiberglass cloth, Teflon ® impregnated fiberglass cloth, thermally insulated glass fabric, laminated aluminum foil and fiberglass, rewettable fiberglass, stainless steel mesh, Zetexplus ®, Tempratex ®, and Lewo-Sil ®, and Alpha Maritex ® which are brand names for the materials described just above, just to name a few.

In addition to the covering 8, there is shown in the breakaway section B of the covering 8, insulation 9. The insulation 9 useful in this invention can be, for example, ceramic fibers, fiberglass, tempmat, kaowool and mineral wool, and the like.

This material is not narrowly critical and anything that will insulate and prevent to a great degree, the transfer of heat, is useful in this invention.

In actual practice of manufacture, the fastener 7 is manufactured by preparing a small bag from the covering material, wherein one edge 11 of the bag is not secured, thus forming a small purse with side walls 10. The pin 1 is inserted into the purse and the pin 1 is caused to pierce a sidewall 10 of the purse and the the pin 1 is placed such that the bottom surface 4 lies flat against the inside of the side wall 10. The purse is then filled with the insulation material 9 so as to cover the top and bottom surfaces, 3 and 4, respectively, and the covering is sewn shut on the open edge 11 to form a small insulated pillow. The fastener 7 is now ready for use.

With regard to the method of use of the fastener 7, there is shown in FIG. 4 a front view of a portion of a jacketed insulating material that is conventionally used on hot surfaces. The insulation material is similar to that used as the insulation of the fastener 7 herein and is described supra in this specification. This insulation cover is essentially a cover 12 of jacketed insulating material and is nominally about $\frac{1}{4}''$ to about 2" thick, depending on how much insulation is used as a filler.

Also shown in the face of the cover 12 is a pin 1 that is used without any covering as was done in the prior art. Shown adjacent to the pin 1, is a fastener 7 of this invention with its jacketed insulating covering 8. Also shown is a sew line 13 wherein a sew line for the pillow as well as the cover is shown with the same number designation.

With regard to FIG. 5, there is shown a back view of the cover 12 of FIG. 4, in which there is shown the piercing end 6 of each of the pins 1 of FIG. 4, and a base securing device 14 for each said pin 1.

It should be noted that the base securing device 14 is being utilized as a gasket or self locking washer for the pin 1 in order to secure the fasteners 7 in the cover 12. Other securing means can be utilized in this invention.

With reference to FIG. 6, one can observe how the fasteners 7 of this invention are utilized. Thus, in use, the fasteners 7 are plunged through a jacketing material containing the insulation and the base securing device i.e. a self-locking washer 14 is slid over the elongated shaft 5.

Finally, the elongated shaft 5 is bent against the base securing device 14 to maintain the fastener 7 in place against the hot surface 15.

While the insulation and jacketing are thus held, there can be placed strapping or bands to hold the blankets or covers in place. Such straps or bands can be secured with Velcro ® or by belting using metal rings. Such belts can be held by the fasteners of this invention.

In the prior art use of the pins 1, as shown in FIG. 4, employees were exposed to burns and cuts from quilting pins on the exterior surface of the removable insulating covers when the covers were removed or re-installed. These temperatures usually range from about 500° to 1000° F. These temperatures are sufficient to burn human skin, and therefore, the covers of the prior art could not be handled except with great difficulty and quite often, the handlers were burned in the process. Further, the metal heads 2 of the pins 1 would often snag clothing and skin leading to an even greater risk in their use. With the fasteners of the invention, the problems of burning and snagging are eliminated.

This invention also contemplates a combination of at least one fastener of this invention, a securing base for each of the fasteners and, located therebetween, an insulating cover, such as disclosed in FIG. 6.

To illustrate the effectiveness of the fasteners 7 of this invention, a test was performed on such fasteners while they were being used to fasten an insulation cover around a hot extruder head.

For this test, a thermal indicating device was used to measure the temperature at the extruder head. The temperature on the surface of the extruder was 485° F. A fastener which was a quilting pin of the prior art was tested and the temperature was 195° F. on its surface. Alongside of the conventional quilting pin, was a fastener of the instant invention and when the top of the this pin was measured, the temperature was 85° F. Thus, the fastener 7 has a temperature that will not burn human skin when the skin comes in contact with the fastener.

What is claimed is:

1. In combination, a fastener, said fastener comprising a penetration device having a metal head and an elongated malleable metal shank;
   said head being essentially flat and having a top surface and a bottom surface;
   said elongated metal shank being fixedly attached to the bottom surface of the metal head, and near the center thereof;
   said elongated metal shank having a piercing end at an end distal to its attachment to the head;
   said metal head being essentially enveloped by an insulating material which is enveloped by a jacketing material;
   a securing base for the fastener and,
   located therebetween, an insulating material covered by a jacketing material.

2. A combination as claimed in claim 1 wherein the securing base is a disk which is essentially flat and has an opening located essentially near its center said disk having a diameter smaller than the diameter of the elongated shank of the fastener.

3. A method of insulating a heated substrate, the method comprising
   (I) providing the heated substrate with an insulating cover;
   (II) tightening the insulating cover around the heated substrate;
   said insulating cover formed by covering insulation with a jacketing material and fastening the insulation and the jacketing material together by piercing the jacketing material and the insulating material with one or more fasteners at spaced intervals and securing each said fastener with a base, each said fastener comprising a penetration device having a metal head with a center and an elongated malleable metal shank;
   said head being essentially flat and having a top surface and a bottom surface;

said elongated metal shank being fixedly attached to the bottom of the metal head, and near the center thereof;

said elongated metal shank having a piercing end at an end distal to its attachment to the head; said metal head being essentially enveloped by an insulating material covered by a jacketing material:

(III) binding the insulation cover to the heated substrate.

* * * * *